United States Patent [19]

Herting et al.

[11] 3,895,116

[45] July 15, 1975

[54] MIXTURES OF VOLATILE FATTY ACIDS HAVING ANTI-FUNGAL AND ANTI-BACTERIAL ACTIVITY

[75] Inventors: David C. Herting, Spencerport; Emma-Jane E. Drury, Rochester, both of N.Y.

[73] Assignee: Eastman Kodak Company, Rochester, N.Y.

[22] Filed: Feb. 5, 1974

[21] Appl. No.: 439,775

Related U.S. Application Data

[63] Continuation-in-part of Ser. No. 202,932, Nov. 29, 1971, abandoned.

[52] U.S. Cl. .............................................. 424/317
[51] Int. Cl. ........................ A01n 9/00; A01n 9/24
[58] Field of Search ................................... 424/317

[56] References Cited
UNITED STATES PATENTS
3,595,665  7/1971  Huitson et al. .................... 252/407

OTHER PUBLICATIONS

R. Phytopathology 50, 781–784, (1960), "Toxicity of Acetic Acid to Cladosporium Cucumerinum," by Strider et al.

Primary Examiner—Albert T. Meyers
Assistant Examiner—Douglas W. Robinson
Attorney, Agent, or Firm—George P. Chandler; Daniel B. Reece, III

[57] ABSTRACT

Mixtures of at least two of propionic, butyric, or isobutyric acids are found to have greater fungicidal activity than any one of the acids alone on certain animal feedstuffs. The mixtures are also found to be antibacterial. The mixtures are useful in treating animal feedstuffs including grains, hay and silage, seed-meals, and high protein feedstuffs.

24 Claims, 1 Drawing Figure

| | | | | | |
|---|---|---|---|---|---|
| A = | 90% | Propionic | 10% | Butyric | 0% Isobutyric |
| B = | 10% | Propionic | 90% | Butyric | 0% Isobutyric |
| C = | 0% | Propionic | 90% | Butyric | 10% Isobutyric |
| D = | 0% | Propionic | 10% | Butyric | 90% Isobutyric |
| E = | 10% | Propionic | 0% | Butyric | 90% Isobutyric |
| F = | 90% | Propionic | 0% | Butyric | 10% Isobutyric |
| G = | 74% | Propionic | 26% | Butyric | 0% Isobutyric |
| H = | 21% | Propionic | 79% | Butyric | 0% Isobutyric |
| I = | 0% | Propionic | 68% | Butyric | 32% Isobutyric |
| J = | 0% | Propionic | 19% | Butyric | 81% Isobutyric |
| K = | 11% | Propionic | 0% | Butyric | 89% Isobutyric |
| L = | 76% | Propionic | 0% | Butyric | 24% Isobutyric |
| M = | 50% | Propionic | 0% | Butyric | 50% Isobutyric |
| N = | 10% | Propionic | 80% | Butyric | 10% Isobutyric |
| O = | 17% | Propionic | 17% | Butyric | 66% Isobutyric |
| P = | 40% | Propionic | 0% | Butyric | 60% Isobutyric |
| Q = | 50% | Propionic | 0% | Butyric | 50% Isobutyric |
| R = | 60% | Propionic | 10% | Butyric | 30% Isobutyric |

Figure 1:
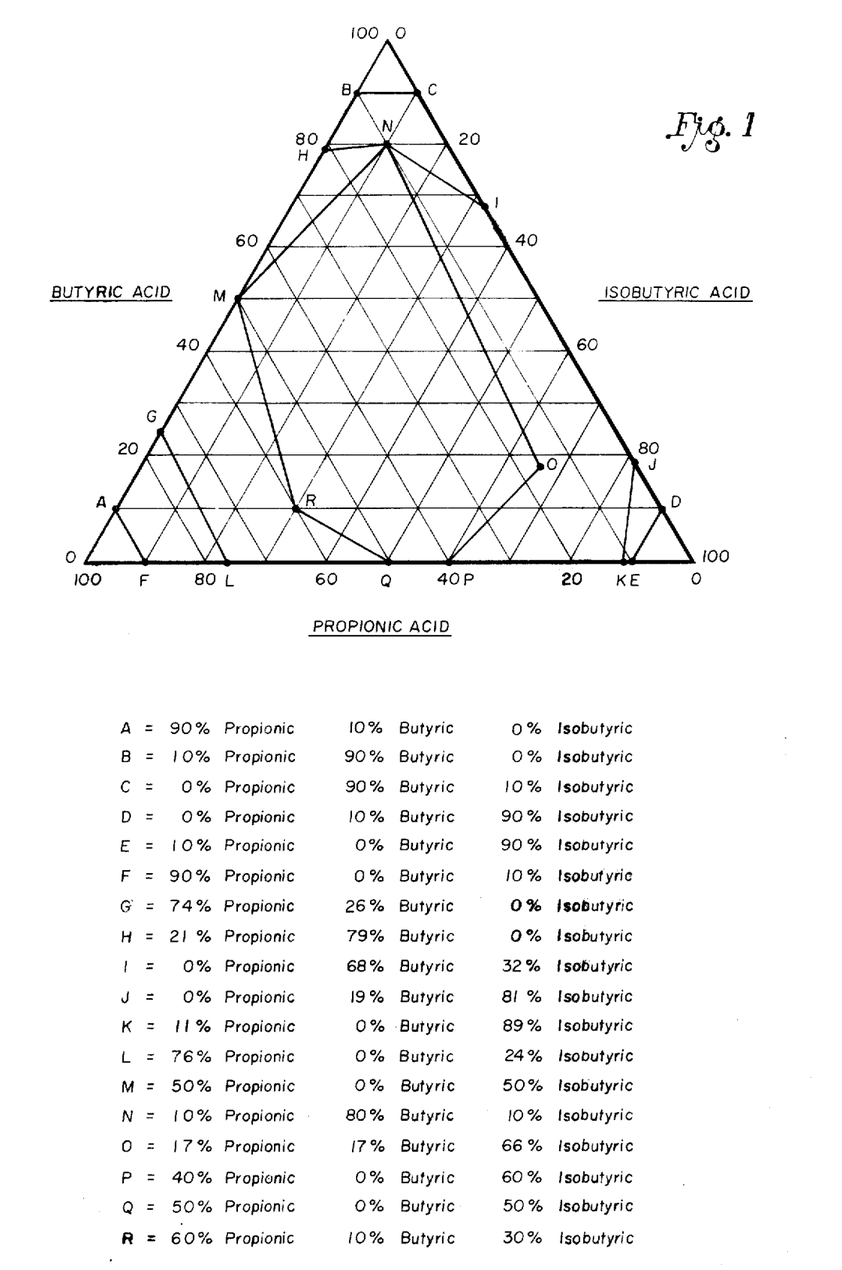

*Fig. 1*

| | | | | | |
|---|---|---|---|---|---|
| A = | 90% Propionic | 10% | Butyric | 0% | Isobutyric |
| B = | 10% Propionic | 90% | Butyric | 0% | Isobutyric |
| C = | 0% Propionic | 90% | Butyric | 10% | Isobutyric |
| D = | 0% Propionic | 10% | Butyric | 90% | Isobutyric |
| E = | 10% Propionic | 0% | Butyric | 90% | Isobutyric |
| F = | 90% Propionic | 0% | Butyric | 10% | Isobutyric |
| G = | 74% Propionic | 26% | Butyric | 0% | Isobutyric |
| H = | 21% Propionic | 79% | Butyric | 0% | Isobutyric |
| I = | 0% Propionic | 68% | Butyric | 32% | Isobutyric |
| J = | 0% Propionic | 19% | Butyric | 81% | Isobutyric |
| K = | 11% Propionic | 0% | Butyric | 89% | Isobutyric |
| L = | 76% Propionic | 0% | Butyric | 24% | Isobutyric |
| M = | 50% Propionic | 0% | Butyric | 50% | Isobutyric |
| N = | 10% Propionic | 80% | Butyric | 10% | Isobutyric |
| O = | 17% Propionic | 17% | Butyric | 66% | Isobutyric |
| P = | 40% Propionic | 0% | Butyric | 60% | Isobutyric |
| Q = | 50% Propionic | 0% | Butyric | 50% | Isobutyric |
| R = | 60% Propionic | 10% | Butyric | 30% | Isobutyric |

…

MIXTURES OF VOLATILE FATTY ACIDS HAVING ANTI-FUNGAL AND ANTI-BACTERIAL ACTIVITY

This is a continuation-in-part of U.S. application Ser. No. 262,932 filed Nov. 29, 1971, now abandoned.

This invention relates to mixtures of volatile fatty acids having greater anti-fungal activity than either acid alone as well as anti-bacterial activity and more particularly relates to mixtures of at least two of propionic, butyric, and isobutyric acids having the anti-fungal and anti-bacterial activity.

Deterioration and loss of various grain, oil seeds, and other feedstuffs is one of the most serious economic problems in the world today. The Food and Agricultural Organization, United Nations, estimated that 5% of all food grains harvested are lost before consumption. The World Health Organization has indicated the magnitude of the problem by quoting 20% post-harvest loss in Africa, Asia and Latin America, and 15% loss in the near East where spoilage in some areas affected 50% of the food in storage. Estimates of the amount lost due to deterioration resulting from fungi range from 0.5–10% of the world's production of grain. A solution to this problem of storage deterioration would affect significantly the world-wide shortage of food that presently exists.

Although these high losses are generally restricted to the less developed nations, which coincidentally are often in the temperate climates that favor fungal growth, significant economic losses also occur in the more developed nations such as the United States. Estimates of losses probably due to fungal damage in government or commercial warehouses range from about 0.5% of the soybeans to about 2% of the corn with a total value of $96,000,000.00. Farm storage losses are higher and range from 4.5% for wheat, oats, rye, barley and rice to 6.0% for corn and grain sorghum with a total value of $262,000,000.00. Though hay is somewhat less valuable than grains and oil seeds, losses are somewhat higher at 5% in commercial storage and 7% during farm storage.

Most of the damage to grain results from fungi which invade the grain after harvesting. The storage fungi comprise about a dozen species of Aspergillus, several species of Penicillium, a single species of Sporendonema and possibly a few species of yeast. Within the last decade, an increased awareness and understanding of a health hazard associated with the fungi has also come about. Under appropriate conditions, molds often produce mycotoxins, of which the best known one is Aflatoxin from *Aspergillus Flavus*. These toxins are of increasing concern because they are harmful to many domesticated animals, will produce hepatic cancer in at least several species, including rats and have been implicated with cirrhosis in children.

Key factors favoring the growth of mold are moderate temperatures and a high relative humidity. The length of time feedstuff is stored and the degree to which it is invaded by storage fungi are also important. Other factors such as presence of foreign material or fines and infestation by insects or mites may accelerate the process. For centuries man has attempted to minimize the influence of these factors with only minor success. Storage losses cited earlier demonstrate that even practices of more advanced agricultural societies have not achieved complete success.

The traditional approach in the United States has been to field dry crops as long as possible and then, after harvesting, to dry further if necessary to the moisture level presumed safe for storage. Some crops such as wheat or oats with shorter growing seasons and with earlier harvesting dates are more suitable for field drying than a crop such as corn which matures later. For any crop, however, these practices result in a relative flood of grain to be dealt with in a short span of time. When the weather is not cooperative, the grain is wetter than usual. Indeed, the farmer may be fortunate to be able to harvest the crop. While literally mountains of grain accumulate to await commercial drying, molding and heating can begin within 24 hours.

These problems are particularly acute with corn, the principal grain crop in the United States. In recent years the problems have been accentuated by the development of highly mechanized, efficient harvesting systems such as the picker-sheller. Although these systems increase the recovery of corn and spread the harvesting season over a longer period of time, they require at least 23% moisture in the grain for maximum effectiveness and thus compound the problem by producing more grain with high levels of moisture.

The basic way for preserving these grains has been drying, either by natural ventilation such as in crib storage or by forced aeration, using either air at ambient temperature or air with supplemental heat in bin dryers, portable batch dryers, or continuous flow dryers. Artifical drying has permitted earlier harvest, better planning, long term storage and generally better quality.

When "hot spots" develop or mold is observed during storage the grain may be re-dried. More frequently, however, the grain is blended out with sound grains or is "turned" either manually or by passing through an auger. The abrasion of such mechanical handling will break up hot spots and usually obscure the fact that mold has been growing but such measures are only temporary and do not stop mold growth.

The crop losses cited earlier testify that the present practices for preserving feedstuffs are not completely effective. Natural drying depends on the whims of weather. When crops are harvested wet, losses may be unavoidable simply because because dryers are either not available or their capacity is insufficient to handle the amount of grain and hay being dried. In other cases, the loss is due to carelessness in not drying sufficiently. Even drying of crops to moisture levels presumed safe for storage is no guarantee because diurnal temperature variations and other factors such as localization of fines may cause moisture migration within storage bins resulting in localized spots of ideal conditions for mold growth. Overdrying grain decreases the influence of the moisture factor for fungi but the resultant brittleness and cracking of the grain increase susceptibility to fungi, reduce grade, and decrease acceptibility by the food processor.

With grain, two other aspects of handling assume great importance and both are more or less encouraged by the official grain standards. The principal commercial classification of corn, for example, is grade 2 for which an allowable maximum of 15.5% moisture is permitted. Because the pricing of the corn is based on this moisture level, moisture is worth money and every effort is made to keep the moisture content as close as possible to this level without exceeding it. However, the maximum allowable moisture content for grains and feeds of the most common grade exceed by several percent the maximum moisture content that will permit safe storage for periods of time of a year or more. Since removal of this additional water is not only costly, but also results in shrinkage of weight without any compensatory increase in value, the grain processor tends to take his chances on storage losses.

A second practice in grain handling is co-mingling of grains. Grain that for any reason contains less than the allowable maximum moisture content can be mixed with grain containing higher than allowable moisture content so long as the average moisture content in the co-mingled grain meets the grain standards. Although this is legal, this practice permits a substrate that is more favorable to fungal growth than if every grain kernel were dried to the specifications of the grain standard.

Recently, there has been interest expressed in the use of formic, acetic, and propionic acids singly or in mixture for treating crops. This interest is exemplified by British Patents No. 1,149,314; NO. 1,155,485; No. 1,160,430; No. 1,219,857 and U.S. Pat. No. 3,595,665.

In accordance with our invention we have found that mixtures of at least two of propionic, butyric, and isobutyric acids when added to certain animal feedstuffs have a synergistic anti-fungal activity. This activity is found whether the mixtures are anhydrous mixture or a mixture diluted with water.

This anti-fungal activity has been observed when the mixture of at least two acids is 0–90% propionic, 0–90% butyric, or 0–90% isobutyric acids. These acid mixtures are also found to be effective when diluted with from about 10–90% by volume of the dilution water and in some instances the dilution with water further enhances the activity of said acid mixture.

The active mixtures found to be effective are further illustrated in FIG. 1 which is a three-phase trangular diagram. This trangular diagram is believed to be self-explanatory especially when taken with the various points identified as A, B, C, etc., as listed in FIG. 1. The percentages are by volume of the composition.

According to one aspect of the invention, mixtures having the desired activity are of at least two of propionic, butyric, and isobutyric acids whose composition lies within the area on the triangular three-phase diagram of FIG. 1 defined by line A, G, M, H, B; line B, C; line C, I, J, D; line D, E; line E, K, P, Q, L, F; line F, A. According to another aspect of the invention the mixture of acids lies within the area on the triangular three-phase diagram of FIG. 1 defined by line G, M, H; line H, N, line N, I; line I, J; line J, K; line K, P, Q, L; line L, G. According to a still further aspect of the invention the mixture of acids lies within the area on the triangular three-phase diagram of FIG. 1 defined by line R, M; line M, N; line N, O; line O, P; line P, Q; line Q, R.

The mixtures may be diluted with from about 10 to about 90% by volume of the dilution water, preferably about 40–90% and especially from about 40–60% by volume of the dilution water. Other preferred mixtures have been found to be 37.5% by volume of propionic acid, 25% by volume butyric acid, 37.5% isobutyric acid; 60% by volume propionic acid, 10% by volume butyric acid, and 30% by volume isobutyric acid; 40% by volume propionic acid, 60% by volume isobutyric acid; 50% by volume propionic acid, 50% by volume isobutyric acid; 10% by volume propionic acid, 90% by volume isobutyric acid. Other preferred dilutions have been found to comprise: 50% by volume of the acid mixture propionic acid, 25% by volume of the acid mixture butyric acid, 25% by volume of the acid mixture isobutyric acid diluted with 50% by volume of the dilution water; 50% by volume of the acids propionic acid, 25% by volume of the acids butyric acid, 25% by volume of the acid isobutyric acid diluted with 90% by volume of the dilution water; 50% by volume of the acids propionic acid, and 50% by volume of the acid isobutyric acid, diluted with 90% by volume of the dilution water; 50% by volume of the acids propionic acid, 50% by volume of the acids isobutyric acid, diluted with 50% by volume of the dilution water; 60% by volume of the acids isobutyric acid, 40% by volume of the acids propionic acid, diluted with 50% by volume of the dilution water.

These acid mixtures and dilutions of acid mixtures may be applied by spraying the feedstuff as it enters an auger or other conveying system being used to load it into a storage area or by other techniques. Hay can be sprayed in the baling chamber, silage can be sprayed as it is chopped or as it is stored, or storage areas may be sprayed. Other application methods familiar to those skilled in the art may be used. The amount of volatile fatty acid mixture to be added depends on a number of factors including the type of feedstuff being treated, the amount of moisture in the feedstuff, the acid mixture used, and whether the acid mixture is anhydrous or diluted with water. We have found the amount of volatile fatty acid mixtures in a water dilution which must be added to have anti-fungal activity to vary from 0.17 grams per 100 grams of corn having a moisture content of 20% to 0.69 grams per 100 grams of corn having a moisture content of 28.4%. Anhydrous mixtures of propionic, butyric and isobutyric acid have been found to have effective anti-fungal activity on 20% moisture content corn at levels of greater than 0.33 grams per 100 grams of corn; on 20% moisture content wheat the effective level has been found to be 0.41 gram or greater; on oats 0.51 gram or greater; on soybeans 0.42 gram or greater; on cottonseed meal 0.97 gram or greater; on soybean meal 0.48 gram per 100 grams or greater and on peanuts in the shell 0.68 gram per 100 grams or greater.

An aqueous dilution (75% water by volume of the dilution) of a mixture of 37.5% propionic, 25% butyric, and 37.5% isobutyric acids has been found to have antibacterial activity at a level of 1.0 gram of acid per 100 grams of tankage. Animal feedstuffs on which application of the binary and ternary acid mixtures according to one aspect of this invention have a synergistic fungicidal effect are observed to include corn, wheat, soybeans and peanuts in shell. Ternary acid mixtures according to another aspect of this invention are observed to have a synergistic effect on grain sorghum, hay, forage silage, and soybean meal. Certain binary mixtures of propionic and isobutyric acids are observed to have a synergistic fungicidal effect on corn and forage silages. Of course, other crops and animal feedstuffs can also be effectively treated with a fungicidal acid mixture disclosed herein. However, the synergistic effect obtained on the above mentioned feedstuffs has not been consistently observed on every feedstuff.

The following examples are further illustrative of the volatile fatty acid mixtures according to applicants' invention. All percentages are percentages by volume unless otherwise noted. The effective fungicidal level (EFL) is weight given in grams/100 grams, and is the lowest level of addition which inhibits mold growth. EFL is determined for corn and small grains in the following manner utilizing what is characterized as a "Miniature Elevator" test.

Polyethylene wash bottles (1,000 ml. capacity) are filled with a predetermined amount of a test material and distilled water added to adjust the moisture content to the desired level. The bottles are capped, shaken, rotated and placed on their sides in a cold room at 4°C. for two days to equilibrate. During the equilibration period the bottles (hereinafter referred to as "elevators") are shaken and turned (still on their sides) three times daily. A representative composite sample of a few grains from each elevator in a given series is tested for moisture content before the test to determine the effective fungicidal level (EFL) is started. The tests are run in series of 12 elevators each plus a control elevator to which no acid mixture is added. A predetermined amount of an acid mixture is added to the surface of the material to be tested in each test elevator. The amount added is varied until EFL is determined as described hereinafter.

After adding the acid mixture each elevator is immediately capped to prevent the escape of acid vapors, and is shaken and rotated vigorously. The caps are replaced by Bunsen valves and each series is set up in a warm room at 30°C. The dispenser tube on each elevator, including the control, is connected to an air supply which is bubbled through distilled water at a rate of 0.3 liter per hour. The positive pressure insures an adequate air supply for maintaining the aerbic fungi in a high relative humidity atmosphere.

The incubation period for the "miniature elevator" test is seven days, after which the contents of the elevator are examined grossly and with a dissecting microscope. Duplicate samplings (about 20–30 kernels) of each grain from "top", "middle", and "bottom" of each elevator are plated on 10% salt-malt agar (Difco 0024 with 10% sodium chloride added) and incubated 48 hours at 30°C. and under greater than 70% relative humidity. The remaining contents of each elevator are then thoroughly mixed in a 6-inch by 9-inch porcelain pan. Twenty kernels are selected at random, placed in 20 ml. distilled water in a 125 ml. Erlenmeyer flask, closed with a cotton plug and shaken four hours at room temperature (25°C.). Spore counts are done on a few drops of water from each flask by using a hemacytometer to count spores in the four corners and the middle square, as for a blood count. This method does not differentiate between living and dead spores and serves only as a guide to aliquot sizes to be taken from the distilled water for dilution in sterile water and subsequent plating on 10% salt-malt agar as modified from Buchanan and Gattani (E. D. Buchanan and R. E. Buchanan, "Bacteriology", McMullen Co., New York (1936) p. 160 and M. L. Gattani, "Phytopathology" 44, pp. 113–115 (1954). These plates and the Erlenmeyer flask containing the grains with water are incubated 48 hours as are plates containing untreated samples of the material tested. After 48 hours the following steps are carried out:

1. The plated kernels kernesl are examined grossly for any mold growth.
2. The plated spore dilutions are examined grossly for any mold growth.
3. The erlenmeyer flasks containing the material tested plus water are swirled and shaken and samples of water taken and placed on microscope slides. These water drops are examined microscopically. Five-hundred spores are counted with high-power ($\times$ 430) and percent present of those germinating determined.

This test is important as it not only reveals spore germination but also yeast and bacterial inhabitation and/or growth. The plated kernels and plated spore solutions can be considered next in importance. Both show at a glance how well internal inoculum has been controlled. The gross examination of elevators shows only how well the external inoculum has been controlled. For example, an elevator can appear to be "mold free" by gross examination but this does not mean there has been a fungicidal action on the part of the anti-fungal until this finding is confirmed by a plating in the spore germination test. From an evaluation of these tests, the level of acid mixture at which inhibition of storage fungi (97–100%) occurs is determined and recorded. If inhibition does not occur in the range tested, higher levels of acid mixtures are tested until inhibition does occur. The lowest level at which inhibition occurs is considered to be the effective fungicidal level (EFL).

The evaluation of fungicidal activity (EFL) of volatile fatty acids (VFA) on soybean meal is performed as follows. Samples of 100 g. of soybean meal are placed in plastic bags (21 $\times$ 35 cm.). The VFA is added by syringe over the surface of the meal in each bag. The bags are closed, and the VFA are mixed into the meal by shaking, rotating and pressing the bag. After mixing, the meal is transferred to cloth mailing bags (15 $\times$ 24 cm.) with drawstring closures and incubated 7 days at 30°C., 77% relative humidity. Untreated samples are included as controls. Microbiological examination of random samples of the incubated meal is carried out as described for corn and small grains, including plating of the meal and of spore solutions on 10% salt-malt agar and microscopic examination of the spore solutions.

The evaluation of volatile fatty acids for fungicidal activity (EFL) on peanuts is done in the same manner as was described for corn and small grains except the peanuts are placed in large beakers (100 g. peanuts/600 ml. beakers). VFA are spread on the walls of the beaker with a syringe. The beaker is covered immediately with 6 mil polyethylene sheeting, rotated and shaken, and incubated for 2 weeks at 30°C., 77% relative humidity. Untreated samples are included as controls. After incubation, each beaker of peanuts is shelled. Each of two 5-gram random samples of nutmeats and one 2-gram random sample of shells is plated on 10% salt-malt agar. The nuts and shells of each sample are then mixed together in 100 ml. distilled water. The water is decanted, and both washings and plates are incubated for 48 hours at 30°C., 77% relative humidity. Microbiological evaluations are done as described for corn and small grains including gross and microscopic examination of the plated shells, nutmeats and spore solutions.

The evaluation of fungicidal activity (EFL) of volatile fatty acids on freshly-cut corn and forage silage is carried out as described for corn and small grains with the following exceptions. The silage is weighed into polyethylene bags (6 mil), the appropriate amount of VFA is added by syringe and the contents of the bags are mixed by shaking. The treated silage is packed into "silos" (1000 ml. plastic wash bottles from which the top one-fourth has been cut off) and the surface of the silage is covered with 6 mil polyethylene film held in place with an aluminum insert of the same diameter as the silo. Untreated samples are included as controls. The silos are stored in darkness at 30°C. for 2 weeks. Microbiological evaluation of random samples of the silage is carried out as described for grains including plating of the silage and the spore solutions on 10% salt-malt agar as well as microscopic examination of the spore solutions.

The evaluation of fungicidal activity (EFL) of volatile fatty acids on loose hay is carried out in the following manner. One hundred gram samples of hay (reconstituted to 30% moisture content) are placed in polyethylene bags (6 mil), the VFA is added by syringe, and the contents of the bag are shaken to mix. Samples from each bag are placed in open petri dishes (9 cm. dia.) and incubated 7 days at 30°C., 77% relative humidity. Untreated samples are included as controls. Microbiological evaluation is performed as for the corn and small grain samples. In brief, these procedures include gross and microscopic examination of random samples of plated hay, of spore solutions and of plated spore solutions.

Synergistic Effect is determined in the following manner. The expected EFL for various mixtures is determined by multiplying the percentage of each component contained in the mixture times its individual EFL when used alone and then adding these expected individual contributions to obtain a total expected EFL. The expected EFL is then divided by the actual EFL observed and converted to percentage by moving the decimal point two places to the right. If the quotient obtained is greater than 100 when converted to a percent, then there is synergistic effect. As a specific example of this method of determining synergistic effect, please refer to Example 1, Table I. Multiplying the percentage of propionic (10%) contained in the mixture times the effective fungicidal level of propionic when used alone (0.83) and repeating for butyric and isobutyric acids, then adding these figures together and rounding two significant figures, one obtains an expected EFL of 0.72. Dividing this expected EFL by the EFL observed of 0.34 a Synergistic Effect of 212% is obtained.

In all tables following "VFA" stands for volatile fatty acids.

Examples 1 through 90

Mixtures of volatile fatty acids in the various volume relationships given in Table I are tested to determine their EFL as described above. Examples 46 through 54, 61 through 69, 71 through 73, and 75, 76, 78, 79, 81, 82 and 84 through 86 of single acids are included for comparison purposes. It will be noted that the effect of a mixture of two acids or three acids is greater than the combined effect of any of the acids alone indicating the existence of synergistic action by the mixture. The results of the tests are shown in Table I.

Table I

Antifungal Activity of Anhydrous Volatile Fatty Acid Mixtures

| Example | Material Treated | Moisture Content % | Volatile Fatty Acid | | | EFL g./100 g. | Synergistic Effect % |
| --- | --- | --- | --- | --- | --- | --- | --- |
| | | | Prop. % | Butyric % | Iso-butyric % | | |
| 1 | Corn | 20 | 10 | 80 | 10 | 0.34 | 212 |
| 2 | Corn | 20 | 66 | 17 | 17 | 0.43 | 181 |
| 3 | Corn | 20 | 33.3 | 33.3 | 33.3 | 0.34 | 213 |
| 4 | Corn | 20 | 25 | 50 | 25 | 0.34 | 213 |
| 5 | Corn | 20 | 30 | 40 | 30 | 0.25 | 292 |
| 6 | Corn | 20 | 50 | 25 | 25 | 0.34 | 222 |
| 7 | Corn | 20 | 11 | 11 | 78 | 0.50 | 132 |
| 8 | Corn | 20 | 80 | 10 | 10 | 0.52 | 154 |
| 9 | Corn | 20 | 25 | 25 | 50 | 0.42 | 168 |
| 10 | Corn | 20 | 17 | 17 | 66 | 0.34 | 200 |
| 11 | Corn | 20 | 30 | 15 | 55 | 0.34 | 207 |
| 12 | Corn | 20 | 60 | 10 | 30 | 0.34 | 223 |
| 13 | Corn | 20 | 55 | 35 | 10 | 0.43 | 179 |
| 14 | Corn | 20 | 30 | 60 | 10 | 0.42 | 177 |
| 15 | Corn | 20 | 20 | 70 | 10 | 0.34 | 216 |
| 16 | Corn | 20 | 10 | 70 | 20 | 0.34 | 210 |
| 17 | Corn | 20 | 10 | 55 | 35 | 0.42 | 208 |
| 18 | Corn | 20 | 10 | 40 | 50 | 0.50 | 137 |
| 19 | Corn | 20 | 20 | 45 | 35 | 0.42 | 169 |
| 20 | Corn | 20 | 35 | 25 | 40 | 0.34 | 212 |
| 21 | Corn | 20 | 40 | 45 | 15 | 0.51 | 147 |
| 22 | Corn | 20 | 50 | 15 | 35 | 0.42 | 179 |
| 23 | Wheat | 20 | 37.5 | 25 | 37.5 | 0.44 | 134 |
| 24 | Soybeans | 20 | 50 | — | 50 | 0.51 | 162 |
| 25 | Soybeans | 20 | 37.5 | 25 | 37.5 | 0.42 | 193 |
| 26 | Soybean Meal | 9 | 37.5 | 25 | 37.5 | 0.48 | 144 |
| 27 | Peanuts in shell | — | 50 | — | 50 | 0.68 | 128 |
| 28 | Peanuts in Shell | — | 37.5 | 25 | 37.5 | 0.68 | 128 |
| 29 | Corn | 20 | 37.5 | 25 | 37.5 | 0.30 | 243 |
| 30 | Corn | 20 | — | 10 | 90 | 0.50 | 128 |
| 31 | Corn | 20 | — | 45 | 55 | 0.40 | 167 |
| 32 | Corn | 20 | — | 90 | 10 | 0.58 | 123 |
| 33 | Corn | 20 | 10 | — | 90 | 0.46 | 141 |
| 34 | Corn | 20 | 40 | — | 60 | 0.30 | 236 |
| 35 | Corn | 20 | 60 | — | 40 | 0.34 | 220 |
| 36 | Corn | 20 | 90 | — | 10 | 0.61 | 133 |
| 37 | Corn | 20 | 10 | 90 | — | 0.56 | 147 |
| 38 | Corn | 20 | 50 | 50 | — | 0.35 | 221 |
| 39 | Corn | 20 | 90 | 10 | — | 0.63 | 130 |
| 40 | Corn | 20 | — | 19 | 81 | 0.45 | 144 |

TABLE I-Continued

Antifungal Activity of Anhydrous Volatile Fatty Acid Mixtures

| Example | Material Treated | Moisture Content % | Volatile Fatty Acid | | | EFL g./100 g. | Synergistic Effect % |
|---|---|---|---|---|---|---|---|
| | | | Prop. % | Butyric % | Iso-butyric % | | |
| 41 | Corn | 20 | — | 68 | 32 | 0.45 | 154 |
| 42 | Corn | 20 | 11 | — | 89 | 0.45 | 145 |
| 43 | Corn | 20 | 76 | — | 24 | 0.45 | 174 |
| 44 | Corn | 20 | 21 | 79 | — | 0.45 | 165 |
| 45 | Corn | 20 | 74 | 26 | — | 0.45 | 178 |
| 46 | Corn | 20 | 100 | — | — | 0.83 | — |
| 47 | Corn | 20 | — | 100 | — | 0.72 | — |
| 48 | Corn | 20 | — | — | 100 | 0.63 | — |
| 49 | Wheat | 20 | 100 | — | — | 0.68 | — |
| 50 | Wheat | 20 | — | 100 | — | 0.58 | — |
| 51 | Wheat | 20 | — | — | 100 | 0.50 | — |
| 52 | Soybeans | 20 | 100 | — | — | 0.89 | — |
| 53 | Soybeans | 20 | — | 100 | — | 0.77 | — |
| 54 | Soybeans | 20 | — | — | 100 | 0.76 | — |
| 55 | Corn | 20 | — | 50 | 50 | 0.41 | 165 |
| 56 | Corn | 20 | 50 | — | 50 | 0.33 | 221 |
| 57 | Corn | 20 | 25 | — | 75 | 0.42 | 162 |
| 58 | Wheat | 20 | — | 50 | 50 | 0.41 | 132 |
| 59 | Wheat | 20 | 50 | — | 50 | 0.42 | 140 |
| 60 | Wheat | 20 | 50 | 50 | — | 0.43 | 146 |
| 61 | Peanuts in Shell | — | 100 | — | — | 0.89 | — |
| 62 | Peanuts in Shell | — | — | 100 | — | 0.86 | — |
| 63 | Peanuts in Shell | — | — | — | 100 | 0.85 | — |
| 64 | Soybean Meal | 9 | 100 | — | — | 0.70 | — |
| 65 | Soybean Meal | 9 | — | 100 | — | 0.86 | — |
| 66 | Soybean Meal | 9 | — | — | 100 | 0.57 | — |
| 67 | Hay | 30 | 100 | — | — | 0.60 | — |
| 68 | Hay | 30 | — | 100 | — | 0.86 | — |
| 69 | Hay | 30 | — | — | 100 | 1.04 | — |
| 70 | Hay | 30 | 37.5 | 25 | 37.5 | 0.48 | 173 |
| 71 | Forage Silage | 80 | 100 | — | — | 0.74 | — |
| 72 | Forage Silage | 80 | — | 100 | — | 2.88 | — |
| 73 | Forage Silage | 80 | — | — | 100 | 0.71 | — |
| 74 | Forage Silage | 80 | 37.5 | 25 | 37.5 | 0.48 | 263 |
| 75 | Corn Silage | 65 | 100 | — | — | 1.00 | — |
| 76 | Corn Silage | 65 | — | — | 100 | 1.04 | — |
| 77 | Corn Silage | 65 | 10 | — | 90 | 0.80 | 130 |
| 78 | Corn Silage | 55 | 100 | — | — | 1.24 | — |
| 79 | Corn Silage | 55 | — | — | 100 | 1.04 | — |
| 80 | Corn Silage | 55 | 10 | — | 90 | 0.86 | 123 |
| 81 | Forage Silage | 77 | 100 | — | — | 0.78 | — |
| 82 | Forage Silage | 77 | — | — | 100 | 0.72 | — |
| 83 | Forage Silage | 77 | 10 | — | 90 | 0.62 | 118 |
| 84 | Grain Sorghum (Milo) | 20 | 100 | — | — | 0.73 | — |
| 85 | Grain Sorghum (Milo) | 20 | — | 100 | — | 0.55 | — |
| 86 | Grain Sorghum (Milo) | 20 | — | — | 100 | 0.48 | — |
| 87 | Grain Sorghum (Milo) | 20 | 70 | 15 | 15 | 0.54 | 123 |
| 88 | Grain Sorghum (Milo) | 20 | 15 | 70 | 15 | 0.38 | 147 |
| 89 | Grain Sorghum (Milo) | 20 | 15 | 15 | 70 | 0.43 | 123 |
| 90 | Grain Sorghum (Milo | 20 | 37.5 | 25 | 37.5 | 0.50 | 118 |

Examples 91 through 155

The effective fungicidal level of aqueous dilutions of volatile fatty acid mixtures is determined in accordance with the miniature elevator procedure outlined above. The results of this determination are shown in Table II. Examples 137 through 139, 146 through 148, and 152 through 154 are presented for comparison purposes to show the effect of aqueous dilution of single volatile fatty acids. Comparing the examples of dilutions of single volatile fatty acids to the examples of mixtures leads one to the conclusion that there is not only a synergistic effect produced by the volatile fatty acid mixtures but also a synergistic effect produced in many instances when the mixtures are added with water. However, the Synergistic Effect is measured in terms of the acid only as in Table I using the effective fungicidal levels for single acids as ascertained on 20% moisture content corn (Examples 46–48).

Table II

Antifungal Activity of Aqueous Dilutions of Volatile Fatty Acid Mixtures

| Example | Material Treated | Moisture Content % | Volatile Fatty Acids | | | Ratio Water VFA | Total Water-VFA Mixture Added g./100 g. | EFL g./100 g. | Synergistic Effect % |
|---|---|---|---|---|---|---|---|---|---|
| | | | Prop. % | Butyric % | Iso-butyric % | | | | |
| 91 | Corn | 20 | 30 | 40 | 30 | 10:90 | 0.34 | 0.31 | 234 |
| 92 | Corn | 20 | 30 | 40 | 30 | 20:80 | 0.52 | 0.42 | 173 |
| 93 | Corn | 20 | 30 | 40 | 30 | 30:70 | 0.52 | 0.36 | 202 |
| 94 | Corn | 20 | 30 | 40 | 30 | 40:60 | 0.61 | 0.37 | 197 |
| 95 | Corn | 20 | 30 | 40 | 30 | 50:50 | 0.70 | 0.35 | 208 |
| 96 | Corn | 20 | 30 | 40 | 30 | 60:40 | 0.87 | 0.35 | 208 |
| 97 | Corn | 20 | 30 | 40 | 30 | 70:30 | 1.05 | 0.32 | 227 |
| 98 | Corn | 20 | 30 | 40 | 30 | 80:20 | 1.14 | 0.23 | 316 |
| 99 | Corn | 18.4 | 30 | 40 | 30 | 90:10 | 1.94 | 0.17 | 427 |
| 100 | Corn | 18.4 | 30 | 40 | 30 | 90:10 | 1.98 | 0.21 | 346 |
| 101 | Corn | 18.9 | 30 | 40 | 30 | 85:15 | 1.44 | 0.21 | 346 |
| 102 | Corn | 20 | 50 | 25 | 25 | 10:90 | 0.34 | 0.31 | 243 |
| 103 | Corn | 20 | 50 | 25 | 25 | 20:80 | 0.43 | 0.34 | 221 |
| 104 | Corn | 20 | 50 | 25 | 25 | 30:70 | 0.52 | 0.36 | 209 |
| 105 | Corn | 20 | 50 | 25 | 25 | 40:60 | 0.61 | 0.36 | 209 |
| 106 | Corn | 20 | 50 | 25 | 25 | 50:50 | 0.52 | 0.26 | 289 |
| 107 | Corn | 20 | 50 | 25 | 25 | 60:40 | 0.70 | 0.28 | 269 |
| 108 | Corn | 20 | 50 | 25 | 25 | 70:30 | 0.61 | 0.18 | 417 |
| 109 | Corn | 20 | 50 | 25 | 25 | 80:20 | 0.88 | 0.18 | 417 |
| 110 | Corn | 20 | 50 | 25 | 25 | 90:10 | 1.67 | 0.17 | 443 |
| 111 | Corn | 20 | 50 | 25 | 25 | 90:10 | 1.50 | 0.15[1] | 502 |
| 112 | Corn | 20 | 30 | 40 | 30 | 90:10 | 1.27 | 0.14[1] | 518 |
| 113 | Corn | 18.5 | 33.3 | 33.3 | 33.3 | 90:10 | 2.01 | 0.21 | 340 |
| 114 | Corn | 18.5 | 80 | 10 | 10 | 90:10 | 2.06 | 0.26 | 307 |
| 115 | Corn | 18.5 | 10 | 80 | 10 | 85:15 | 2.09 | 0.29 | 249 |
| 116 | Corn | 18.5 | 10 | 10 | 80 | 85:15 | 2.09 | 0.29 | 227 |
| 117 | Corn | 18.5 | 60 | 20 | 20 | 90:10 | 2.01 | 0.21 | 267 |
| 118 | Corn | 18.5 | 20 | 60 | 20 | 90:10 | 2.01 | 0.21 | 344 |
| 119 | Corn | 18.5 | 20 | 20 | 60 | 90:10 | 2.01 | 0.21 | 329 |
| 120 | Corn | 18.5 | 20 | 40 | 40 | 90:10 | 2.01 | 0.21 | 336 |
| 121 | Corn | 18.5 | 40 | 20 | 40 | 90:10 | 2.01 | 0.21 | 347 |
| 122 | Corn | 18.5 | 40 | 40 | 20 | 85:15 | 2.10 | 0.30 | 249 |
| 123 | Corn | 18.5 | 30 | 40 | 30 | 90:10 | 1.97 | 0.17 | 426 |
| 124 | Corn | 18.5 | 50 | 25 | 25 | 90:10 | 1.97 | 0.17 | 444 |
| 125 | Corn | 24.8 | 33.3 | 33.3 | 33.3 | 80:20 | 1.99 | 0.39 | 183 |
| 126 | Corn | 24.8 | 80 | 10 | 10 | 75:25 | 2.08 | 0.48 | 166 |
| 127 | Corn | 24.8 | 10 | 80 | 10 | 80:20 | 1.99 | 0.39 | 185 |
| 128 | Corn | 24.8 | 10 | 10 | 80 | 85:15 | 1.91 | 0.31 | 212 |
| 129 | Corn | 24.8 | 60 | 20 | 20 | 85:15 | 1.91 | 0.31 | 248 |
| 130 | Corn | 24.8 | 20 | 60 | 20 | 80:20 | 1.99 | 0.39 | 186 |
| 131 | Corn | 24.8 | 20 | 20 | 60 | 80:20 | 2.02 | 0.42 | 163 |
| 132 | Corn | 24.8 | 20 | 40 | 40 | 80:20 | 2.02 | 0.42 | 168 |
| 133 | Corn | 24.8 | 40 | 20 | 40 | 80:20 | 1.99 | 0.39 | 186 |
| 134 | Corn | 24.8 | 40 | 40 | 20 | 80:20 | 1.95 | 0.35 | 213 |
| 135 | Corn | 24.8 | 32 | 15 | 53 | 80:20 | 1.94 | 0.34 | 208 |
| 136 | Corn | 18.5 | 35 | 20 | 45 | 90:10 | 1.98 | 0.18 | 393 |
| 137 | Corn | 20 | 100 | — | — | 50:50 | 0.90 | 0.45 | — |
| 138 | Corn | 20 | — | 100 | — | 50:50 | 0.84 | 0.42 | — |
| 139 | Corn | 20 | — | — | 100 | 50:50 | 0.71 | 0.36 | — |
| 140 | Corn | 20 | — | 50 | 50 | 50:50 | 0.59 | 0.30 | 225 |
| 141 | Corn | 20 | 50 | — | 50 | 50:50 | 0.51 | 0.25 | 292 |
| 142 | Corn | 20 | 24 | — | 76 | 50:50 | 0.51 | 0.25 | 272 |
| 143 | Corn | 24.8 | 50 | 50 | — | 80:20 | 1.99 | 0.39 | 199 |
| 144 | Corn | 24.8 | — | 50 | 50 | 85:15 | 1.91 | 0.31 | 218 |
| 145 | Corn | 24.8 | 50 | — | 50 | 85:15 | 1.91 | 0.31 | 236 |
| 146 | Corn | 24.8 | 100 | — | — | 75:25 | 2.12 | 0.52 | — |
| 147 | Corn | 24.8 | — | 100 | — | 80:20 | 2.06 | 0.46 | — |
| 148 | Corn | 24.8 | — | — | 100 | 80:20 | 1.99 | 0.39 | — |
| 149 | Corn | 18.5 | 50 | 50 | — | 90:10 | 2.05 | 0.25 | 310 |
| 150 | Corn | 18.5 | — | 50 | 50 | 90:10 | 2.05 | 0.25 | 270 |
| 151 | Corn | 18.5 | 50 | — | 50 | 90:10 | 2.01 | 0.21 | 348 |
| 152 | Corn | 18.5 | 100 | — | — | 75:25 | 2.40 | 0.60 | — |
| 153 | Corn | 18.5 | — | 100 | — | 80:20 | 2.22 | 0.42 | — |
| 154 | Corn | 18.5 | — | — | 100 | 85:15 | 2.09 | 0.29 | — |
| 155 | Corn | 20 | 50 | 50 | — | 50:50 | 2.05 | 0.25 | 310 |

[1] But unacceptable because of yeast growth

Example 156

An aqueous mixture of volatile fatty acids is tested to determine the effective level required to inhibit or eradicate salmonella in tankage. Commercially prepared tankage is sterilized by autoclaving 15 minutes at 15 psi. *Salmonella gallinarum*, a relatively innocuous salmonella species obtained in a selenite-cystine broth culture, is introduced (1 ml.) into 100 ml. of selenite-cystine broth and incubated for 48 hours at 37°C. A high bacterial count is thus obtained and added at a level of 100 ml. per 100 grams sterile tankage. After adding the culture to the tankage, enough sterile physiological saline solution is added to form a thick "slurry". This mixture is stirred thoroughly and incubated for 24 hours at 37°C. Additional tankage is then added with thorough mixing until the mixture is just moist. This artificially contaminated tankage is dried 2 hours at 37°C. before use. Eight 100 gram portions of the dry contaminated tankage are weighed into separate 32-ounce clear screw-cap bottles. The bottles containing tankage are treated by adding various amounts of a volatile fatty acid mixture of 37.5% propionic, 25% butyric, 37.5% isobutyric acids to the tankage in the bottles along with 3.75 ml. of water. Each bottle is capped and mixed on a rotary mixer for 30 minutes and the bottles incubated at 37°C. with the caps placed loosely on top. After 24 hours, 48 hours, and 1 week, two ten-gram samples are removed from each bottle. One sample is added to selenite-cystine broth, the other sample is added to tetrathionate broth (Difco 0104-01) (10 grams tankage per 100 ml. broth) and both are incubated for 24 hours at 37°C. After incubation, 3 mm. loopfuls of each broth culture are streaked on SS Agar (Salmonella-Shigella Agar, Difco 0074-01) and on BG Agar (Brilliant Green Agar, Difco 00285-01). The petri plates are incubated 24 hours at 37°C. and examined carefully for the presence of salmonella colonies.

After one week, the mixture is found to be salmonellacidal at one ml. acid mixture per 100 grams tankage but not salmonellacidal at 0.75 ml. acid mixture per 100 grams of tankage.

In accordance with applicants' invention there has been produced a mixture of volatile fatty acids having a high degree of anti-fungal and anti-bacterial activity on a variety of crops and animal feed stuffs.

Although the invention has been described in considerable detail with reference to certain preferred embodiments thereof, it will be understood that variations and modifications can be effected without departing from the spirit and scope of the invention as described hereinabove.

We claim:

1. A synergistic fungicidal mixture for animal feedstuffs selected from the group consisting of corn, wheat, soybeans and peanuts in shell consisting essentially of at least two of propionic, butyric, and isobutyric acids whose composition lies within the area on the triangular three phase diagram of FIG. 1 defined by:

A. line A, G, M, H, B;
line B, C;
C. line C, I, J, D;
D. line D, E;
E. line E, K, P, Q, L, F; and
F. line F, A.

2. The mixture of claim 1 wherein the composition lies within the area on the triangular three-phase diagram of FIG. 1 defined by:

A. line G, M, H;
B. line H, N;
C. line N, I;
D. line I, J;
E. line J, K;
F. line K, P, Q, L; and
G. line L, G.

3. The mixture of claim 1 wherein the composition lies within the area on the triangular three phase diagram of FIG. 1 defined by:

A. line R, M;
B. line M, N;
C. line N, O;
D. line O, P;
E. line P, Q; and
F. line Q, R.

4. An aqueous solution of the acid mixture of claim 1 which is from about 40–90% by volume water.

5. An aqueous solution of the acid mixture of claim 2 which is from about 40–90% by volume water.

6. An aqueous solution of the acid mixture of claim 3 which is from about 40–90% by volume water.

7. The mixture of claim 1 wherein said acid mixture is about 40% by volume propionic acid and about 60% by volume of the isobutyric acid.

8. An aqueous solution of the acid mixture of claim 7 which is about 50% by volume water.

9. A synergistic fungicidal mixture for animal feedstuffs selected from the group consisting of grain sorghum, hay, forage silage, and soybean meal consisting essentially of about 10 to 80% by volume of the mixture of propionic acid, about 10 to 80% by volume of the mixture butyric acid and about 10 to 80% by volume of the mixture isobutyric acid.

10. An aqueous solution of the acid mixture of claim 9 which is from about 40–90% by volume water.

11. The mixture of claim 9 wherein said acid mixture is about 37.5% by volume of the mixture propionic acid, 25% by volume of the mixture butyric acid and 37.5% by volume of the mixture isobutyric acid.

12. An aqueous solution of the acid mixture of claim 11 which is about 50% by volume water.

13. A synergistic fungicidal mixture for animal feedstuffs selected from the group consisting of corn, corn silage and forage silage consisting essentially of about 10% by volume of the mixture propionic acid and about 90% by volume of the mixture isobutyric acid.

14. An aqueous solution of the acid mixture of claim 13 which is from about 40–90% by volume water.

15. A method for preventing the growth of mold in animal feedstuffs selected from the group consisting of corn, wheat, soybeans and peanuts in shell which comprises treating the feedstuff with a mold inhibiting quantity of a mixture of at least two of propionic, butyric, and isobutyric acids according to claim 1.

16. A method for preventing the growth of mold in animal feedstuffs which comprises treating the feedstuff selected from the group consisting of corn, wheat, soybeans and peanuts in shell with a mold inhibiting quantity of a mixture of at least two of propionic, butyric, and isobutyric acids according to claim 4.

17. A method for preventing the growth of mold in animal feedstuffs which comprises treating the feedstuff selected from the group consisting of corn, wheat, soybeans and peanuts in shell with a mold inhibiting quantity of a mixture of propionic and isobutyric acids according to claim 7.

18. A method for preventing the growth of mold in animal feedstuffs selected from the group consisting of corn, wheat, soybeans and peanuts in shell which comprises treating the feedstuff with a mold inhibiting quantity of a mixture of propionic and isobutyric acids diluted with water according to claim 8.

19. A method for preventing the growth of mold and bacteria in animal feedstuffs selected from the group consisting of grain sorghum, hay, forage silage and soybean meal which comprises treating the feedstuff with a mold inhibiting quantity of a mixture of propionic, butyric and isobutyric acids according to claim 9.

20. A method for preventing the growth of mold in animal feedstuffs selected from the group consisting of grain sorghum, hay, forage silage and soybean meal which comprises treating the feedstuff with a mold inhibiting quantity of a mixture of propionic, butyric and isobutyric acids diluted with water according to claim 10.

21. A method for preventing the growth of mold in animal feedstuffs selected from the group consisting of grain sorghum, hay, forage silage and soybean meal which comprises treating the feedstuff with a mold inhibiting quantity of a mixture of propionic, butyric and isobutyric acids according to claim 11.

22. A method for preventing the growth of mold in animal feedstuffs selected from the group consisting of grain sorghum, hay, forage silage and soybean meal which comprises treating the feedstuff with a mold inhibiting quantity of a mixture of propionic, butyric and isobutyric acids diluted with water according to claim 12.

23. A method for preventing the growth of mold in animal feedstuff selected from the group consisting of corn, corn silage and forage silage which comprises treating the feedstuff with a mold inhibiting quantity of a mixture of propionic and isobutyric acids according to claim 13.

24. A method for preventing the growth of mold in animal feedstuffs selected from the group consisting of corn, corn silage and forage silage which comprises treating the feedstuff with a mold inhibiting quantity of a mixture of propionic and isobutyric acids diluted with water according to claim 14.

* * * * *

PO-1050
(5/69)

UNITED STATES PATENT OFFICE
CERTIFICATE OF CORRECTION

Patent No. 3,895,116      Dated July 15, 1975

Inventor(s) David C. Herting and Emma-Jane E. Drury

It is certified that error appears in the above-identified patent and that said Letters Patent are hereby corrected as shown below:

In the drawing, line "M" should read

---M = 50% Propionic    50% Butyric    0% Isobutyric---

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*